United States Patent [19]

Cooper et al.

[11] Patent Number: 4,884,333
[45] Date of Patent: Dec. 5, 1989

[54] METHOD OF MAKING A STEPPER MOTOR

[75] Inventors: Roy Cooper, Waterbury; Charles Hansen, Wolcott, both of Conn.

[73] Assignee: Tri-tech, Inc., Waterbury, Conn.

[21] Appl. No.: 312,765

[22] Filed: Feb. 21, 1989

Related U.S. Application Data

[62] Division of Ser. No. 121,170, Dec. 30, 1987, Pat. No. 4,841,189.

[51] Int. Cl.$^4$ ............................................. H02K 15/02
[52] U.S. Cl. ......................................... 29/596; 310/42; 310/257
[58] Field of Search ..................... 29/596, 598; 310/42, 310/257, 263, 216, 254

[56] References Cited

U.S. PATENT DOCUMENTS 4,355,248 10/1982 Manson .................................. 310/42
4,381,465 4/1983 Renkl et al. ..................... 310/257 X Primary Examiner—Carl E. Hall
Attorney, Agent, or Firm—Lee C. Robinson, Jr.

[57] ABSTRACT

A multi-phase stepper motor having an annular permanent magnetic rotor and a plurality of matingly engageable stator phase assemblies around the rotor. Each of the phase assemblies comprises a pair of annular pole pieces including interleaved salient stator poles. The stator pole pieces in each pair are mated together in an opposed relationship to form an annular space between them to receive an energizing winding, and the winding for each pair is of a different phase. Depending upon the number of phase assemblies, the machine can operate in more than two phases. The diameter of the rotor is between about 55 percent and about 75 percent of the motor diameter, and approximately 40 percent more torque is produced than with equivalent sized conventional motors.

4 Claims, 5 Drawing Sheets

METHOD OF MAKING A STEPPER MOTOR

This application is a division of application Ser. No. 121,170, filed Dec. 30, 1987, now U.S. Pat. No. 4,841,189.

BACKGROUND OF THE INVENTION

This invention relates to electrical rotating machines and more particularly to electric motors of the type in which the rotor of the motor turns in discreet increments or steps, and to a method for making such motors. The invention more specifically relates to a stepper motor utilizing a rotor preferably having a diameter that is at least 60% of the motor diameter to provide substantially more torque than equivalent-sized conventional motors.

The use of multiple field coils with a single non-salient pole rotor in a stepper motor is well-known in the art and is shown by such prior patents as U.S. Pat. No. 4,241,270 and U.S. Pat. No. 4,274,026. To prevent radial displacement of the stator within the motor assembly, stator pole pieces have heretofore been notched such that adjacent stator pole pieces may be frictionally interlocked. Representative motors of this type are disclosed, for example, in U.S. Pat. No. 4,333,026 and U.S. Pat. No. 3,495,113. These prior art references, however, do not provide for any number of individual stator phase assemblies including a plurality of stator pole pieces and a notched field ring to be interlocked together. Thus, it would be advantageous if one could link more than two stator assemblies, with each assembly being of different phase such that the motor could operate in more than two phases. In addition, it is desirable to provide a stepper motor assembly wherein the same parts can be used to achieve more than two phases, and hence, reduce tooling costs.

The stepper motor of the present invention also includes, in a preferred embodiment, a rotor having a diameter that is at least approximately 55% of the motor diameter and thus produces substantially more torque than equivalent sized conventional motors.

The present invention is directed towards solving these problems and provides a workable and economical solution to them.

OBJECTS OF THE INVENTION

It is therefore a general object of the present invention to provide an improved stepper motor and method of making the same.

It also an object of the present invention to provide a stepper motor which is capable of linking at least two stator pole pieces of different phases together such that the stepper motor is capable of operating in greater than two phases.

It is a further object of the present invention to provide a stepper motor which is made up of a plurality of stator phase assemblies each including two pole pieces forming an opening for a coil of wire and further including a notched and slotted field ring with each of the stator phase assemblies being interlocked relative to one another.

It is still a further object of the present invention to provide a stepper motor with identical individual phase assemblies to thereby reduce tooling costs and facilitate manufacture.

It is yet a further object of the present invention to provide a stepper motor having notches placed on each stator pole assembly to give proper phase relationships between the pole plates within an assembly and between adjacent assemblies.

It is a still further object of the present invention to provide a stepper motor which has a rotor diameter which is at least approximately 55% of the motor diameter and thus produces substantially more torque than equivalent sized conventional motors.

SUMMARY OF THE INVENTION

The foregoing and other objects are accomplished by means of the electric rotating machine and method in accordance with the present invention. In a preferred embodiment, the machine includes an annular permanent magnetic rotor having rotor poles of alternating polarity around its circumference. One or more outer stator phase assemblies are provided which each include a pair of stator pole pieces of annular configuration. Each stator pole piece has spaced-apart axially extending stator poles along its outer periphery in magnetic flux relationship with the rotor. The stator poles of one of the pair of pole pieces are of an opposite polarity and are interleaved with the stator poles of the other respective pole piece. Annular energizing means are provided surrounding the entire periphery of the rotor and are disposed substantially entirely within the annular space between the pair of stator pole pieces and an annular field ring for producing a magnetic field in the salient stator poles of the pair of pole pieces. The annular field ring has a plurality of notches and projections extending from the side edges of its outer peripheral surface. These notches and projections permit identical outer stator phase assemblies of different phases to be frictionally interlocked thereby providing a self-contained motor assembly which can operate in more than two phases.

In several advantageous arrangements in accordance with the invention, the annular field ring additionally includes a series of peripheral slots in the center of the ring which each accommodate two projecting tabs on the respective pole pieces. The field ring is fabricated from a flat blank which is rolled around the assembled pole pieces to position the tabs within the slots and thereby further facilitate the manufacture of the motor with the pole pieces in precise alignment.

The adjacent outer stator phase assemblies of the motor are frictionally interlocked at a mechanical displacement of one-half the stator tooth pitch (90 electrical degrees for a two-phase motor). This displacement serves to shift the direction of the stator flux passing through the rotor-stator air gap as the flux builds up during starting. Accordingly, this shift in direction due to the delayed start-up of the stator flux of the stator poles will impart a unidirectional starting characteristic to the motor in a manner well understood by those conversant in the art.

The electrical rotating machine of some embodiments of the present invention also includes a first and a second mounting plate. Both of these mounting plates are provided with a plurality of slots which may be securely retained by projections extending from the outer stator phase assemblies to thereby self-contain the rotor and stator assemblies within the electric rotating machine. One of the mounting plates is provided with a plurality of screw holes such that it may be mounted and secured at a desired location.

Furthermore, the electric rotating machine of several good embodiments of the invention includes a rotor diameter that is at least approximately 55% of the motor diameter, thus producing about 40% more torque than equivalent-sized conventional motors.

The above and other objects, features and advantages of the present invention will be apparent from the following detailed description of illustrative embodiments thereof, which is to be read in conjunction with the accompanying drawings, wherein:

DESCRIPTION OF CERTAIN PREFERRED EMBODIMENTS

Figure 1:
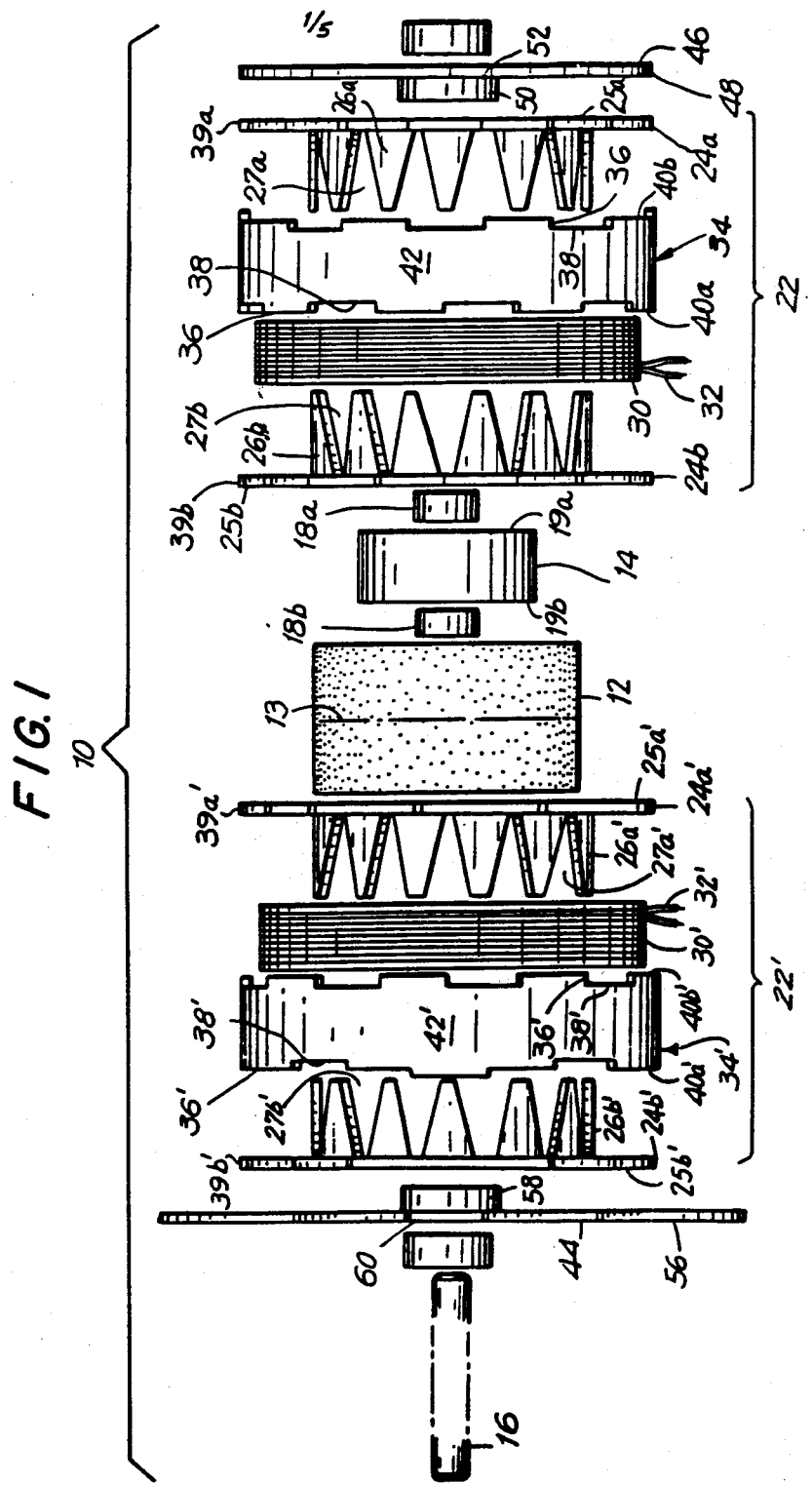
FIG. 1 is an exploded perspective view of the stepper motor in accordance with an illustrative embodiment of the present invention.

Referring now to the drawings in detail, and initially to FIGS. 1 through 4, an electrical motor 10 constructed in accordance with a preferred embodiment of the present invention is illustrated. The present invention, while of general application, is particularly well suited for use as a stepper motor, i.e., an electrical rotating machine in which the rotor of the machine runs in discrete increments or steps.

In this preferred embodiment, the motor 10 includes a permanent magnet rotor 12 having a set of non-salient permanent magnet rotor poles of alternating polarity around its outer periphery. Non-salient rotor poles are preferred because of the decreased cost of such rotors over salient rotor poles or individual permanent magnets supported in an annular non-magnetic carrier. The permanent magnet rotor 12 has 12 non-salient north poles and 12 non-salient south poles alternating around its outer periphery, for a total of 24 poles. The total number of rotor poles can, of course, be any even number.

Figure 3:
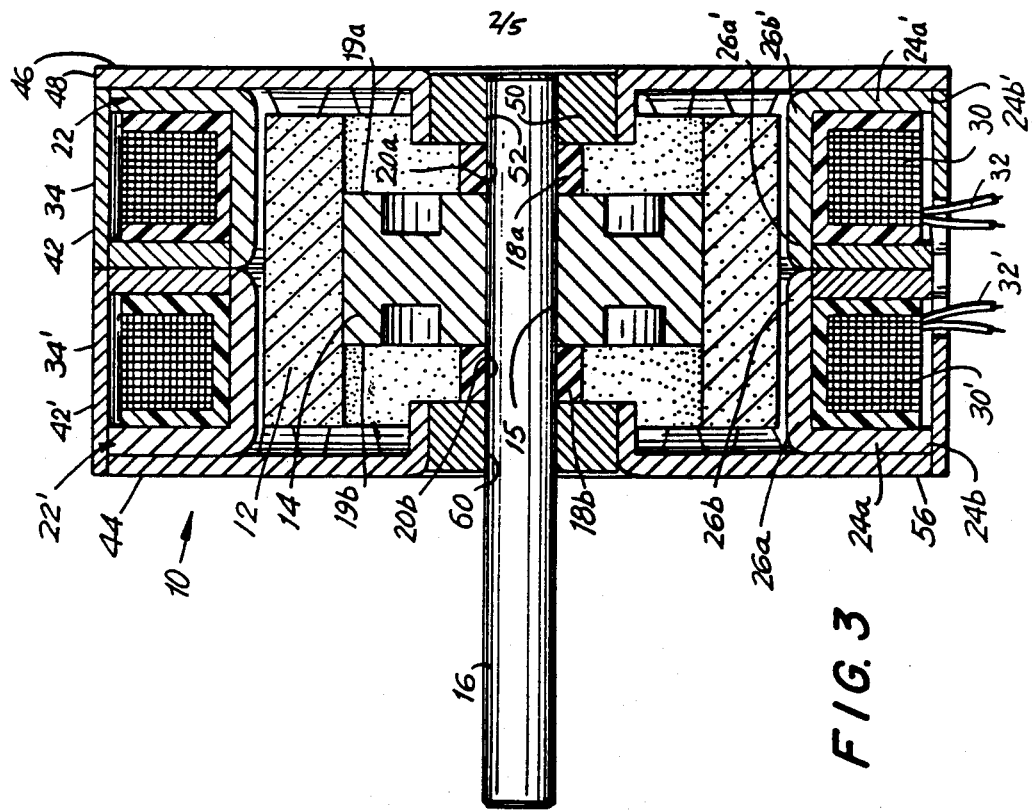
FIG. 3 is a sectional view of the stepper motor taken along line 3—3 of FIG. 2.

The rotor 12 is supported by a wheel 14 fixedly mounted to the interior of rotor 12 (see FIG. 3). The wheel 14 has an opening 15 through which the rotor shaft 16 is centrally mounted within the stepper motor. A pair of bearing bosses 18a and 18b are positioned on opposite side surfaces 19a and 19b, respectively, of the wheel 14. These bearing bosses 18a and 18b include annular openings 20a and 20b through which the rotor shaft 16 is inserted, and hence, the openings provide a retention member for retaining the rotor shaft 16 in its centralized position within the motor.

The motor 10 has at least one outer stator phase assembly 22 of annular configuration disposed generally concentrically around the outer periphery of rotor 12. In the embodiment shown in FIGS. 1 through 4, two of these outer stator phase assemblies 22 and 22' are shown interlocked relative to one another. As will be discussed herein, the interlocking capabilities of the outer stator phase assemblies of different phases permits the interconnection of two or more outer stator phase assemblies and thus provides for operation of the motor in two or more phases. Since the two outer stator phase assemblies shown in the drawings are identical and interchangeable, the drawings illustrate the corresponding character references for the second outer stator phase assembly with a "'" symbol. However, the character references, such as 22 and 22°, will be collectively referred to as 22, unless otherwise disclosed herein.

Each of the outer stator phase assemblies 22 includes a pair of cup-shaped stator pole pieces 24a and 24b. The pole pieces have respective annular bases 25a and 25b. Each of the stator pole pieces has preferably 12 integrally formed stator teeth, although any number of stator teeth may be utilized, and the teeth extend at right angles from the inner periphery of their corresponding bases. The stator pole pieces 24a and 24b are identical, thus achieving economies in manufacturing and spare parts inventory.

The teeth 26a of stator pole piece 24a extend downwardly from base 25a, as viewed in FIG. 1, with the space between teeth 26a forming an inverted V-shaped notch 27a. Teeth 26b extend upwardly from base 25b of pole piece 24b, the space between adjacent teeth 26b forming a V-shaped notch 27b. In assemblage, the cup-shaped pole pieces 24a and 24b are mated together in opposed relationship with the teeth 26a inserted within the V-shaped notches 27b of rotor pole piece 24b and the teeth 26b of rotor pole piece 24b inserted within the V-shaped notches 27a of rotor pole piece 24a.

In this configuration, the pole pieces 24a and 24b form an annular space between them to receive energizing means comprising an annular wound coil of wire 30. This winding 30 is disposed substantially entirely within the annular space, as is shown in cross-section in FIGS. 3 and 4. The winding 30 is supplied with single phase current pulses by lead wires 32, thus magnetizing the 12 poles of pole piece 24a with one polarity and the 12 poles of pole piece 24b with the other polarity.

In order to reliably support the stator phase assemblies 22 within the stepper motor 10, each phase assembly 22 has a field ring 34 which provides an outer backing for the assembly. In order to link more than one stator phase assembly 22 together, such that the motor 10 can operate in two, three, four, five, etc. phases, each field ring 34 includes a plurality of projections 36 and notched recesses 38 along the first and second peripheral side edges 40a and 40b of the ring. Upon proper orientation, the projections 36 on the side surface 40a of one field ring 34 will interlock within the recesses 38 in the second side surface 40b of another field ring. Similarly, upon proper orientation, the projections 36 on the side surface 40b of one field ring will interlock within the recesses 38 in the side surface 40a of another field ring. In this configuration, multiple field rings may be stacked and frictionally interlocked within the motor assembly such that each stator phase assembly 22 can be of a different phase and more than two phases can be attained within each motor assembly.

Figure 2:
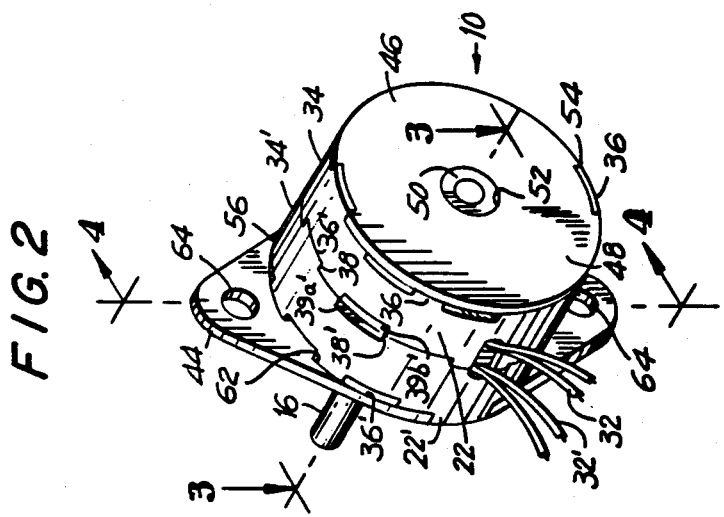
FIG. 2 is a rear perspective view of the stepper motor shown in FIG. 1.
Figure 4:
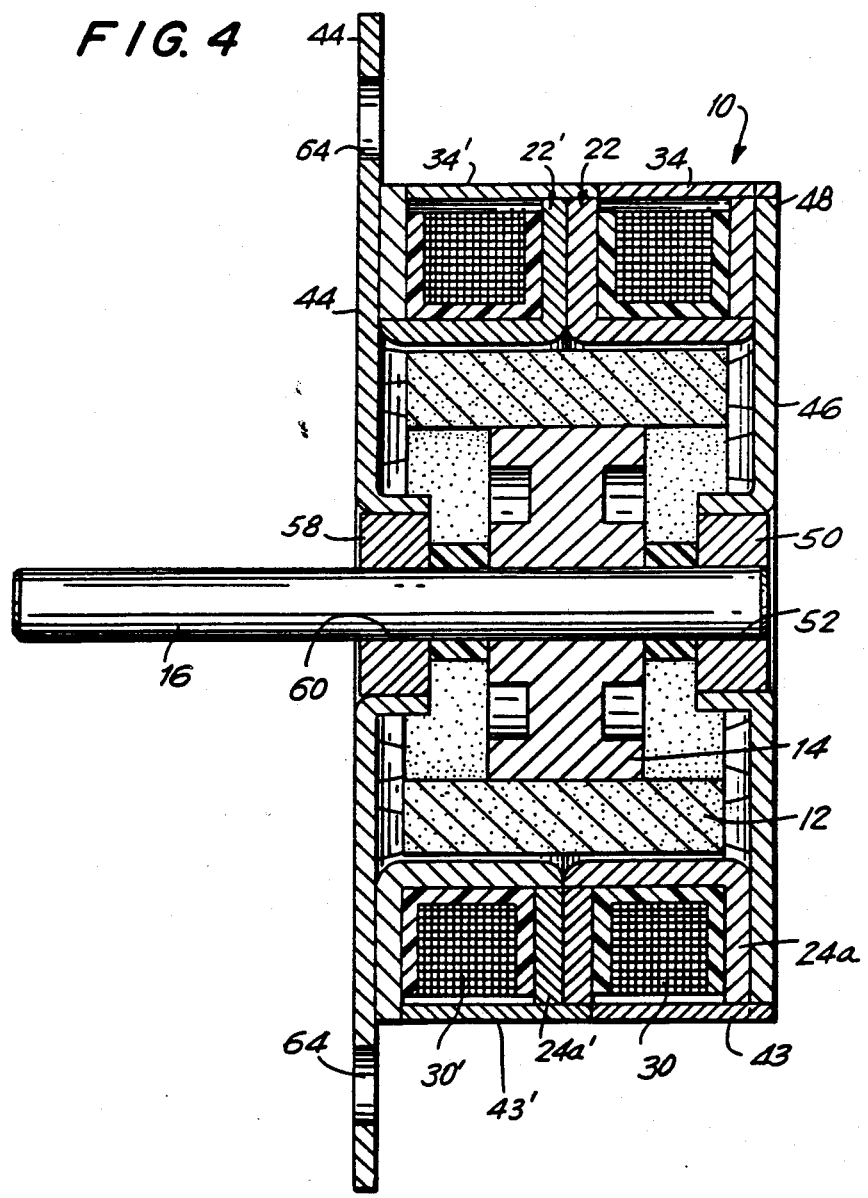
FIG. 4 is a sectional view of the stepper motor taken along line 4—4 of FIG. 2.

Each of the stator pole pieces 24a, 24a', 24b and 24b' is provided with four outwardly extending tabs 39a, 39a', 39b and 39b', respectively. These tabs are coplanar with the corresponding bases of the pole pieces, and the tabs on each pole piece are positioned at ninety mechanical degree intervals. As best seen in FIG. 2, during the assembly of the motor the tabs 39a' and 39b on the inner pole pieces 24a' and 24b (FIG. 1) are oriented in overlapping relationship with each other and are inserted in the openings formed by the inwardly facing recesses 38 and 38' in the field rings 34 and 34'. The tabs 39a and 39b' on the outer pole pieces 24a and 24b' similarly are disposed within the outwardly facing recesses in the field rings.

As a result of this interlocking feature of the field rings 34, each stator phase assembly 22 will have its stator pole pieces at a 90 electrical degree index spacing from the stator pole pieces of an adjacent stator phase assembly. As a direct result thereof, this displacement will impart a unidirectional characteristic to the motor in a manner well understood by those conversant with the art. In addition, the displacement of the stator pole pieces creates a self-starting characteristic.

In order to securely mount the stator phase assemblies 22 and the rotor assembly 12 within the stepper motor, there are provided front and rear mounting plates 44 and 46, respectively. The rear mounting plate 46 includes a disc-shaped base 48 and a bearing boss 50 extending inwardly from the base 48. The bearing boss 50 includes an aperture 52 (FIG. 2) through which the rotor shaft 16 is centrally mounted. The rear mounting plate also includes a plurality of grooves 54 around its periphery which receive the projections 36 on one of the field rings 34 such that the plate is securely retained within the motor assembly.

In the illustrated embodiment the front mounting plate 44 is of a generally diamond or pear shape, although in other embodiments the plate may be of substantially any configuration depending upon the requirements of the user. The plate 44 includes a base 56 and a bearing boss 58 extending from the base. The bearing boss 58 is provided with an aperture 60 through which the rotor shaft 16 is centrally mounted. A plurality of grooves 62 similar to the grooves 54 are provided in the periphery of the plate 44 which receive the projections 36 on the side edges 40a and 40b of the field ring 34. In this manner, the plate 46 may be reliably mounted adjacent the stator phase assembly 22' within the motor assembly. As a result of this configuration of the mounting plates, rotor, and stator phase assemblies, the motor assembly is entirely self-contained.

The motor 10 has about 40 percent more torque than any known equivalent-sized motor. Since the maximum torque for a given size motor is a function of the rotor diameter versus the volume of steel versus the volume of copper, if there is too much copper or too much steel, the output torque decreases. Conversely, if the rotor diameter can be increased in a given motor assembly while not unduly affecting the amount of copper and steel, the torque will correspondingly increase.

Figure 5:
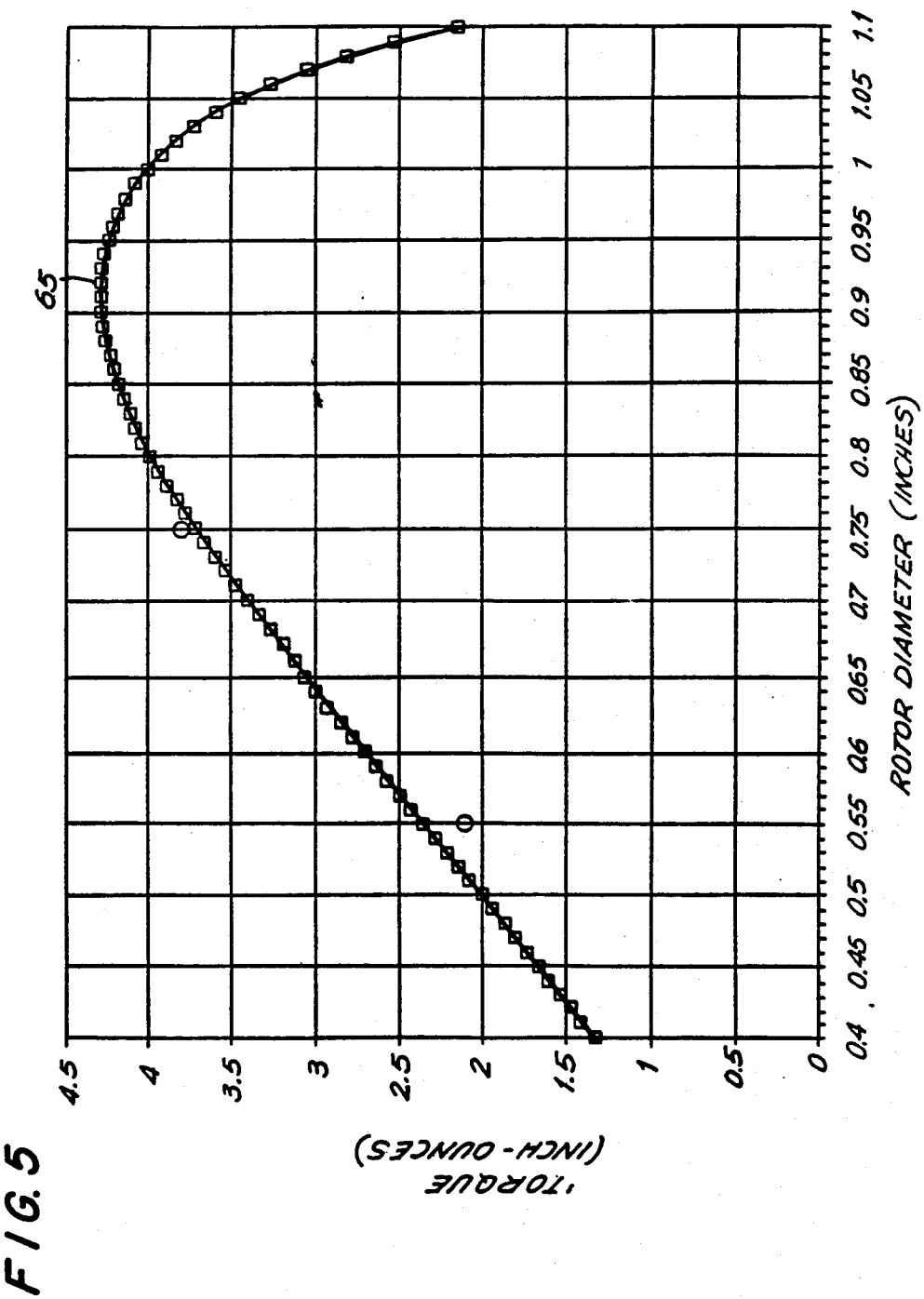
FIG. 5 is a chart plotting rotor diameter versus output torque of the stepper motor.

FIG. 5 is a chart showing the relationship between rotor diameter and output torque for a motor having a diameter of 1.4 inches and a fixed power input. The curve 65 in FIG. 5 demonstrates that the output torque peaks when the diameter of the rotor is about 0.90 inches. This corresponds to a rotor diameter which is approximately 64 percent of the diameter of the motor. Although the torque begins to drop off when the diameter of the rotor exceeds about 0.950 inches or approximately 68 percent of the motor diameter, the torque remains at a comparatively high level until the rotor diameter reaches 1.05 inches or approximately 75 percent of the diameter of the motor. For smaller rotors the torque also is comparatively high until the rotor diameter drops below 0.75 inches or approximately 55 percent of the motor diameter. By maintaining the rotor to motor diameter ratio within the range of from about 55 percent to about 75 percent, particularly good results are achieved, and the output torque is approximately 40 percent higher than conventional equivalent-sized motors which customarily have a rotor diameter that is about 40 to 50 percent or less of the diameter of the motor.

The rotor 12 may be one unitary structure cooperating with all of the stator phase assemblies, as is shown in FIG. 1, or each individual stator phase assembly may be provided with a separate rotor as is indicated by the broken line 13 through the rotor 12 in FIG. 1.

Figure 6:
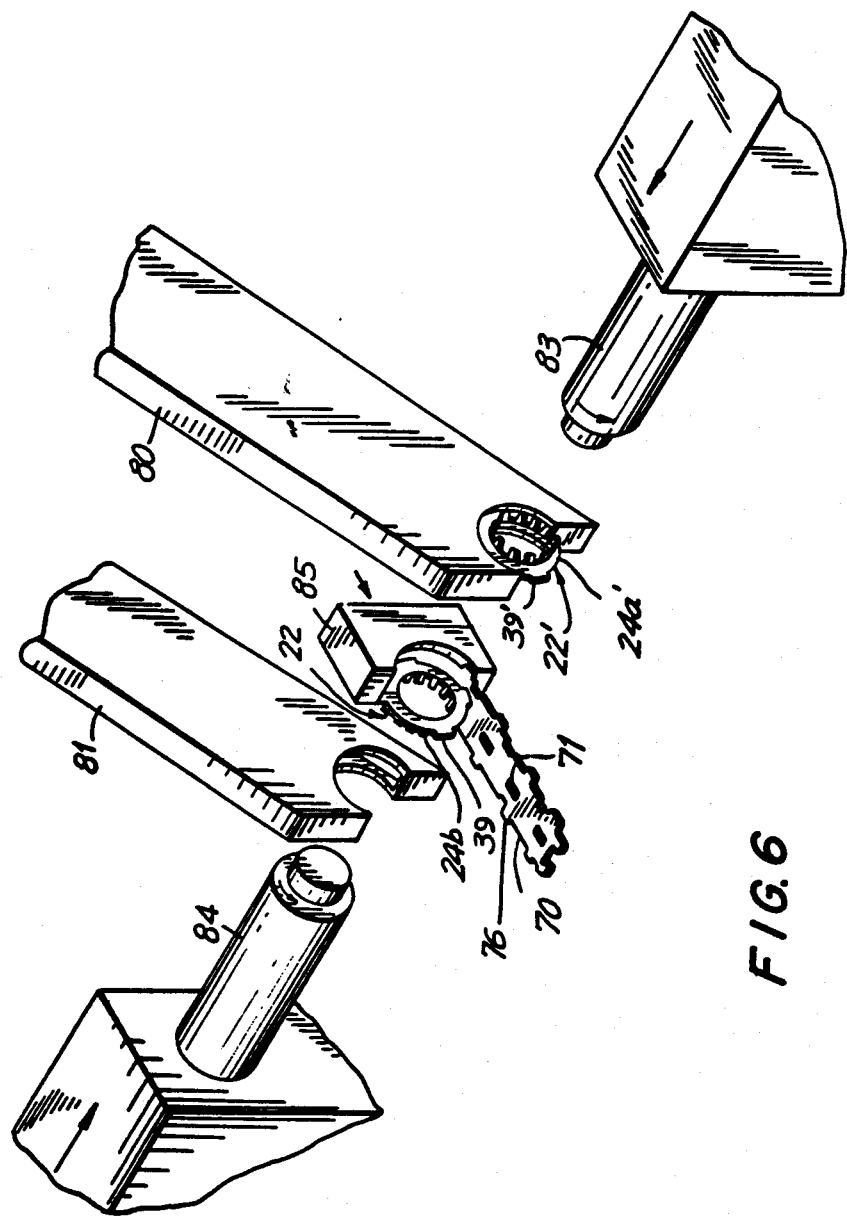
FIG. 6 is a fragmentary perspective view showing a method for assembling certain components of another illustrative embodiment of the invention.

Similarly, the motor may be provided with a separate field ring 34 or 34' for each of the stator phase assemblies, or a single field ring may enclose all of the phase assemblies. Referring to FIG. 6, for example, there is shown a single field ring 70 that cooperates with each of the stator assemblies 22 and 22'. The field ring 70 comprises a flat strip of cold rolled steel or other magnetic material that is provided with longitudinally extending slots 71 spaced along the center portion of the ring. Each of these slots has a width that is twice the thickness of the tabs 39 and 39' on the pole pieces 24a' and 24b of the respective phase assemblies. Projections 76 along the longitudinal edges of the field ring 70 interleave with the corresponding grooves 54 and 62 (FIG. 2) on the mounting plates 46 and 44 or on adjacent field rings depending upon the number of phase assemblies in the motor.

To assemble the pole pieces 24a' and 24b, the pole pieces are fed by gravity down chutes 80 and 81, respectively, to a pair of opposed mandrels 83 and 84. The mandrels 83 and 84 are then moved axially toward one another to position the pole pieces 24a' and 24b in back-to-back contact with each other within a shaping die 85. The pole pieces are welded together within the die 85 with the tabs 39 and 39' in coextensive overlapping relationship with each other.

The mandrels 83 and 84 then rotate the assembled pole pieces 24a' and 24b while the field ring strip 70 is introduced into the die 85. As the strip 70 moves into the die 85, it is rolled around the pole pieces 24a' and 24b such that the strip is given a cylindrical configuration with each pair of the aligned tabs 39 and 39' disposed in one of the slots 71 in the strip. The tabs 39 and 39' are located on the pole pieces in position to automatically provide the required phase displacement between the assemblies 22 and 22'. The arrangement is such that the cost of manufacturing the motor is substantially reduced while at the same time providing a precise and reliable method of aligning the phase assemblies.

In the embodiment of FIGS. 1–4 the field rings 34 and 34' and the mounting plates 44 and 46 serve as a multi-part housing for the machine. Similarly, in the embodiment of FIG. 6 the multi-part housing is formed by the field ring 70 in cooperation with the mounting plates. In each of these embodiments the component parts of the housing are locked together by the various protrusions, tabs and grooves to reliably retain the parts in position.

The terms and expressions which have been employed are used as terms of description and not of limitation, and there is no intention in the use of such terms or expressions of excluding any equivalents of the features shown and described or portions thereof. Although illustrative embodiments of the invention have been described with reference to the accompanying drawings, it is to be understood that various changes and modifications can be made therein without departing from the scope or spirit of the invention.

What is claimed is:

1. In a method of making an electric rotating machine having an annular permanent magnet rotor with rotor poles of alternating polarity around its circumference, the steps of:
   assembling two stator phase assemblies each including a pair of pole pieces of annular configuration in opposed relationship with each other to form an annular space therebetween, each said pole piece including along its inner periphery spaced-apart salient stator poles, with the stator poles of the pole pieces of each stator phase assembly being interleaved with one another;
   orienting the stator phase assemblies such that the stator poles on the pole pieces of one of the assemblies have a 90 electrical degree index spacing from the stator poles on the pole pieces of the other assembly;
   permanently affixing a first pole piece of one of said stator phase assemblies to a second pole piece of the other stator phase assembly with the stator poles oriented to provide said index spacing, each of said first and second pole pieces having a plurality of spaced tabs around its periphery, the orientation of the stator phase assemblies positioning the tabs on said first pole piece in overlapping facing contact with the tabs on said second pole piece;
   forming a flat blank of magnetic material with side edges each including a plurality of grooves and protrusions and with equally spaced longitudinal grooves intermediate said side edges;
   bending said flat blank around the affixed first and second pole pieces with the overlapping tabs extending into said longitudinal grooves to form a field ring for said stator phase assemblies, the field ring comprising a portion of a multi-part housing for said machine; and
   positioning a pair of energizing windings in respective cooperating relationship with said stator phase assemblies to enable the formation of magnetic fields in different phase relationship with each other.

2. In a method as set forth in claim 1, the further step of:
   positioning additional parts of said multi-part housing in a magnetic flux relationship with the side edges of said field ring with the protrusions on said side edges disposed in grooves in said additional parts.

3. In a method of making an electric rotating machine having a rotor with rotor poles of alternating polarity around its circumference, the steps of:
   assembling two stator phase assemblies each including a pair of pole pieces in opposed relationship with each other, each said pole piece including spaced-apart salient stator poles, with the stator poles of the pole pieces of each stator phase assembly being interleaved with one another;
   orienting the stator phase assemblies such that the stator poles on the pole pieces of one of the assemblies have a 90 electrical degree index spacing from the stator poles on the pole pieces of the other assembly;
   permanently affixing a first pole piece of one of said stator phase assemblies to a second pole piece of the other stator phase assembly with the stator poles oriented to provide said index spacing, each of said first and second pole pieces having a plurality of spaced tabs around its periphery, the orientation of the stator phase assemblies positioning the tabs on said first pole piece in overlapping facing contact with the tabs on said second pole piece;
   forming a flat blank of magnetic material with side edges and with equally spaced longitudinal grooves intermediate said side edges;
   bending said flat bank around the affixed first and second pole pieces with the overlapping tabs extending into said longitudinal grooves to form a field ring for said stator phase assemblies, the field ring comprising a portion of a multi-part housing for said machine; and
   positioning a pair of energizing windings in respective cooperating relationship with said stator phase assembles to enable the formation of magnetic fields in different phase relationship with each other.

4. In a method of making an electric rotating machine having a rotor with rotor poles of alternating polarity around its circumference, the steps of:
   assembling two stator phase assemblies each including a pair of pole pieces in opposed relationship with each other, each said pole piece including spaced-apart salient stator poles, with the stator poles of the pole pieces of each stator phase assembly being interleaved with one another;
   orienting the stator phase assemblies such that the stator poles on the pole pieces of one of the assemblies have a 90 electrical degree index spacing from the stator poles on the pole pieces of the other assembly;
   permanently affixing a first pole piece of one of said stator phase assemblies to a second pole piece of the other stator phase assembly with the stator poles oriented to provide said index spacing, each of said first and second pole pieces having a flat annular base portion and a plurality of spaced tabs extending around the periphery, the orientation of the stator phase assemblies positioning the tabs on said first pole piece in overlapping facing contact with the tabs on said second pole piece;
   forming a flat blank of magnetic material with side edges each including a plurality of grooves and protrusions and with equally spaced longitudinal grooves intermediate said side edges;
   bending said flat blank around the affixed first and second pole pieces with the overlapping tabs extending into said longitudinal grooves to form a field ring for said stator phase assemblies, the field ring comprising a portion of a multi-part housing for said machine; and
   positioning a pair of energizing windings in respective cooperating relationship with said stator phase assembles to enable the formation of magnetic fields in different phase relationship with each other.

* * * * *